A. W. GROTE.
TRANSMISSION FOR AUTOMOBILES.
APPLICATION FILED JUNE 30, 1917.

1,265,078.

Patented May 7, 1918.

INVENTOR
Alfred W. Grote

WITNESS:

BY
ATTORNEYS

A. W. GROTE.
TRANSMISSION FOR AUTOMOBILES.
APPLICATION FILED JUNE 30, 1917.

1,265,078.

Patented May 7, 1918.
2 SHEETS—SHEET 2.

WITNESS:

INVENTOR
Alfred W. Grote
BY
ATTORNEYS

UNITED STATES PATENT OFFICE.

ALFRED W. GROTE, OF BROOKLYN, NEW YORK.

TRANSMISSION FOR AUTOMOBILES.

1,265,078. Specification of Letters Patent. Patented May 7, 1918.

Application filed June 30, 1917. Serial No. 177,951.

*To all whom it may concern:*

Be it known that I, ALFRED W. GROTE, a citizen of the United States, residing in the borough of Brooklyn of the city of New York, in the State of New York, have invented certain new and useful Improvements in Transmissions for Automobiles, of which the following is a specification, reference being had to the accompanying drawings, forming a part hereof.

This invention relates to a combined magnetic and mechanical transmission for automobiles in which the objectionable features of magnetic and mechanical transmissions alone are eliminated and the desirable features thereof are retained and combined in such manner as to insure a flexible drive at different speeds and a simple control. In accordance with the invention the usual sets of gears for giving the different speed ratios are retained, but these sets of gears instead of being slidable under the control of the operator as by means of mechanical or electrical devices remain always in mesh, respectively, so that the inconvenience and liability to damage constantly present with shiftable gears are overcome. The several transmission gears are provided with separate magnetic drives, the control of which is placed selectively in the hands of the operator. By providing separate magnetic drives non frictional for the respective speed gears, reliance is placed on only one of such drives for each different speed, so that derangement of any one drive will not affect the operation of the remaining drives. In this way, the objectionable features of the usual single unit magnetic drive are eliminated and the required flexibility is retained. The combining of the magnetic drives, operating through magnetic drag, without frictional contact, with the mechanical speed reduction through gears constitutes the most important advance made by the present invention. Reference is to be had to the accompanying drawings for a detail description of one illustrative embodiment of the invention, in which—

Figure 3:
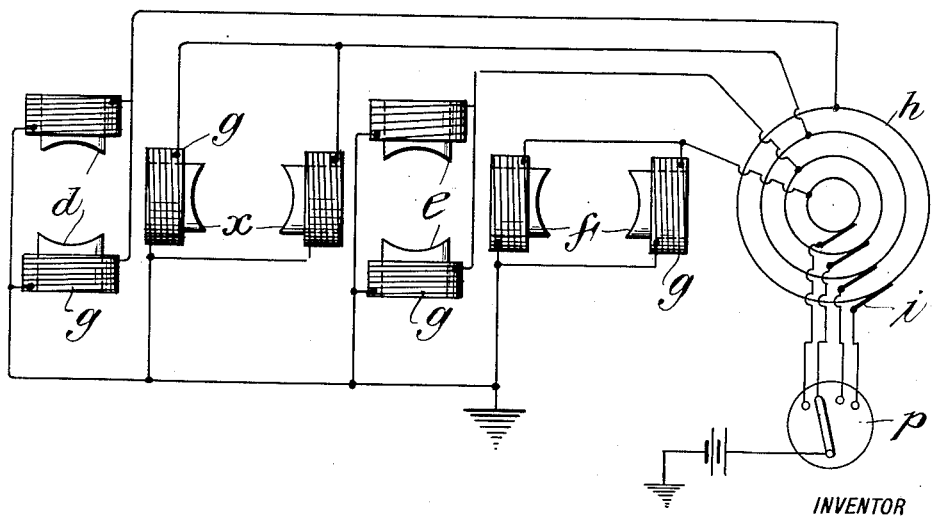
Fig. 3 is a schematic view of the electrical controlling system for the magnetic drives.

The motor shaft $a$ may carry thereon the usual flywheel $b$ to the face of which may be secured a revolving cage or housing $c$ for the elements of the magnetic drive. This cage $c$ carries in its peripheral wall several pairs of pole pieces $d$, $e$, $f$, the poles of each pair being diametrically opposed, and for compactness and convenience in construction, some pairs of which may be set at 90° from other pairs. In the illustrated embodiment there are shown four such pairs of pole pieces, since that number will be required for a transmission in which there are three speeds forward and reverse. Each pole piece may be laminated, as usual, and provided with an energizing or field coil $g$, these poles being mounted for accessibility on the outer peripheral wall of the cage $c$. The pairs of respective coils, as indicated schematically in Fig. 3, are connected respectively to contact rings $h$, mounted on the end wall of the cage $c$. Operatively mounted with relation to each one of these rings is a brush $i$ connected to a suitable source of current and a switch or other controlling device $p$ whereby current may be led to any one of the pairs of field coils depending upon which one the operator desires to energize for control of the car in a manner which will appear.

Figure 1:
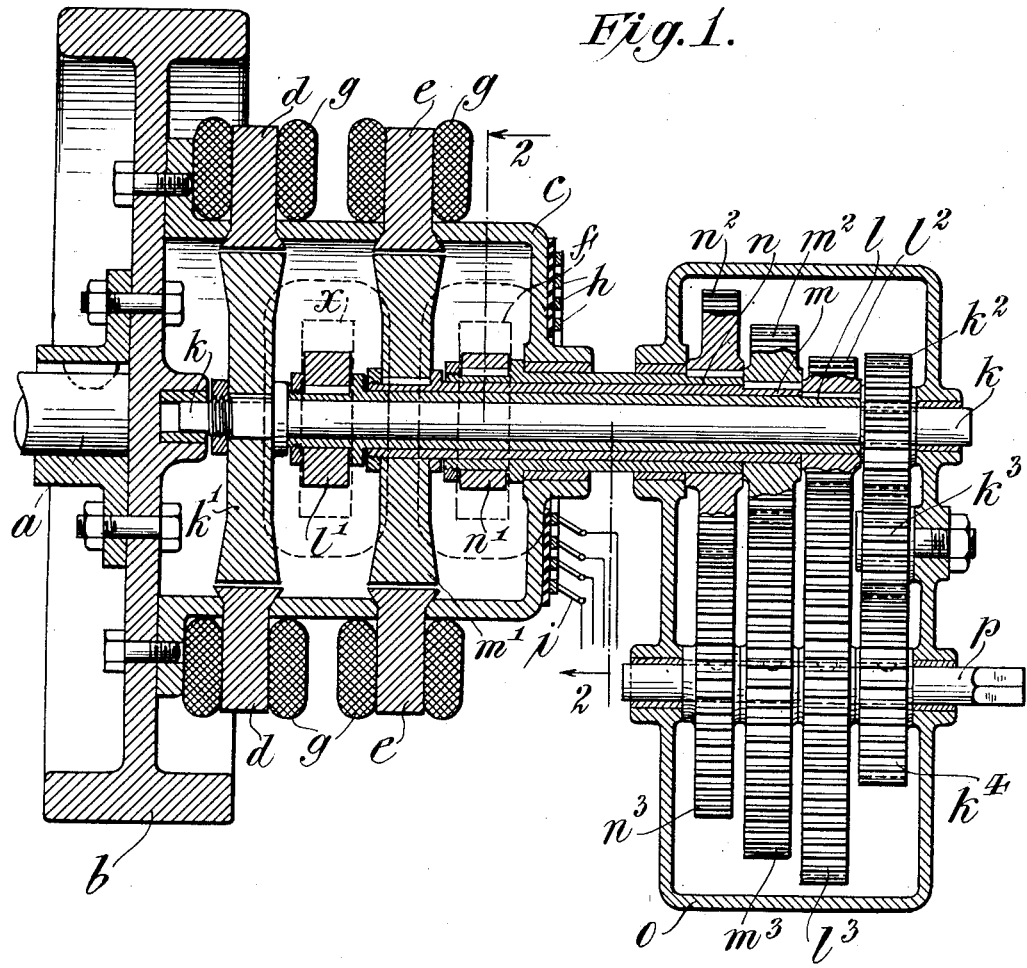
Figure 1 is a view in section taken through the revolving cage of the magnetic units and the gear housing.
Figure 2:
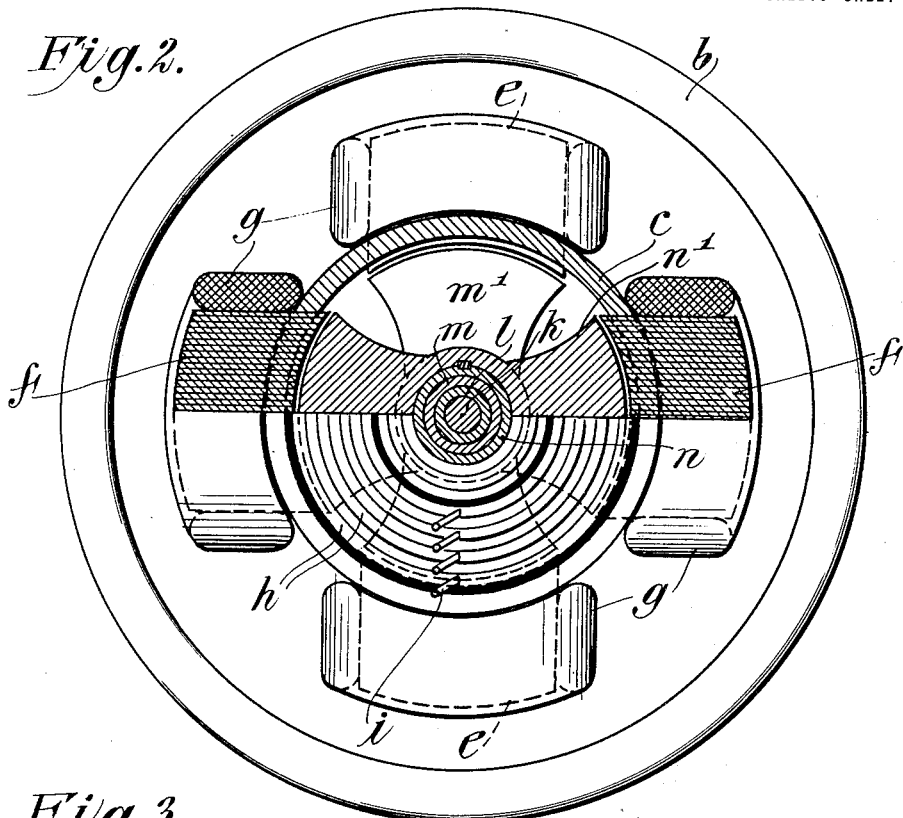
Fig. 2 is a view partly in section and partly in elevation, taken along the plane indicated by the broken lines 2—2 of Fig. 1 and looking in the direction of the arrows.

Extending through the end wall of the cage $c$ and journaled therein by any suitable bearings are several shafts, the inner one $k$ of which may be solid while the outer ones $l$, $m$, $n$, are tubular to receive rotatably the shaft disposed therein. These shafts are of different lengths, as appears particularly from Fig. 1, and on the ends of each one within the cage $c$ is mounted an armature $k'$, $l'$, $m'$ and $n'$, respectively. These armatures are of suitable form and dimensions and extend diametrically through the cage between the respective pairs of pole pieces, the outer end of each armature conforming to the shape of the face of each pole piece, so that there will be left between the armatures and the pole pieces air gaps of about the usual width provided in machines of this character. The other ends of the several shafts $k$, $l$, $m$, $n$, extend into a gear casing $o$ and terminate at different points within the gear casing, so as to carry on such ends speed gears $k^2$, $l^2$, $m^2$, $n^2$, respectively, these gears being of any predetermined diameter according to the speed ratios desired. Within the gear casing $o$ is also journaled a separate shaft $p$ which may be coupled with the usual propeller shaft, and on the shaft $p$ are mounted to mesh with the respective gears on the shafts $l$, $m$, $n$, speed gears $l^3$, $m^3$ $n^3$, respectively. The gear $k^2$ on the fourth shaft $k$ may mesh with an idler $k^3$ mounted in the gear case $o$ and this idler may, in turn, mesh with the gear $k^4$ on the shaft $p$, the introduction of the idler $k^3$ in this train, giving the desired reverse. The transmission just described partakes in many respects of the so-called progressive type, although it is to be understood that the particular arrangement of gears and shafting described is not to be considered limiting except as pointed out in the claims.

In the operation of the improved transmission, it will be understood that the gears within the casing $o$ are in constant mesh, the speed ratio obtained through the several pairs of gears being predetermined and such as would be found suitable for the uses to which the particular automobile is to be placed. The fly-wheel $b$ with the cage $c$ revolves constantly by reason of its direct connection to the motor shaft $a$. So long as the controlling devices for the several circuits in which are included the rings $i$ are open, the circuits will remain open and the cage $c$ will revolve idly. When the operator desires to start the car, for instance, he moves the appropriate controlling device, whether it be a push button or lever, so as to energize one of the pairs of coils $g$ and thereby set up a magnetic drag on the proper armature, say, the armature $l'$ for lowest speed without frictional contact between the driving part and the driven part. Rotation of the armature $l'$ with its shaft $l$ and gear $l^2$ is, of course, transmitted to the driving shaft $p$ through the gear $l^3$, all of the other fields $g$ at this time being deënergized and the remaining gears revolving idly. When sufficient momentum has been acquired and it is desired to change to a higher speed the coils $g$ for the armature $l'$ will be cut out and the coils for, say, the armature $m'$, will be energized by proper manipulation of the controlling devices for their circuit, so that the drive of the motor will be taken magnetically through the shaft $m$ to the gears $m^2$, $m^3$. For high speed, the operator will cut out the last named coils and energize the coils for the armature $n'$ so as to obtain the high speed ratio given by the gears $n^2$, $n^3$. For reverse, the coils for the armature $k'$ will be energized and reverse drive obtained through the idler $k^3$ in a manner which will be evident.

From the foregoing description, it will be evident that the speed variations are obtained primarily through change speed gears arranged in sets of different ratios in a manner commonly employed, but these several sets of gears remain constantly in mesh so that the inconvenience attached to their constant shifting, as is usual in mechanical transmissions, is eliminated. Further, the objectionable mechanical features incidental to mechanical gear shifting devices are overcome. The gears remain in constant mesh and run noiselessly and give the desired speed variations in a positive manner. The magnetic drive obtained with the several units described is flexible, but since separate drives are provided for the separate speeds, the derangement of any one drive will not prevent operation of the car through the remaining drives. It will be quite evident, for instance, that were the low speed magnetic drive out of commission for some reason, the car might be started slowly on second speed or, indeed, on high speed. If desirable, it will be evident to the skilled mechanic that resistances for the different circuits might be introduced and these reistances made controllable, so that for each one of the magnetic driving units provided, a limited variation of the flux and consequent slippage might be obtained sufficient to give a limited variation of speed and power, which would insure that absolute flexibility which would best protect the magnetic elements in the transmission. It will be observed that the transmission of power between the rotatable magnetic fields and the armatures without contact of metal to metal, avoids the objections to the use of frictional clutches and at the same time affords greater elasticity in speed variation.

Changes in the precise form of the elements described may be made without departing from the spirit of the invention, which, as noted before, resides primarily in the combining of a magnetic clutch operating solely through magnetic drag without frictional contact between the members and mechanical transmission in such manner as to overcome the objections now common to each of these transmission when used alone.

I claim as my invention:

1. A transmission comprising a driving shaft, a driven shaft, speed gears in constant mesh interposed operatively between said shafts, magnetic devices operatively interposed between said driving shaft and the driving gears and comprising a magnetic field and an armature for each speed gear, the one carried with the driving shaft and the other with the gear, with an air gap between and means to control the magnetic devices selectively.

2. A transmission comprising a driving shaft, a driven shaft, speed gears in constant mesh interposed operatively between said shafts, separate shafts on which the driving gears are mounted, armatures on each of said last named shafts, magnetic devices coöperating with said armatures to couple them magnetically with the driving shaft and means to control the magnetic devices selectively.

3. A transmission comprising a driving shaft, a driven shaft, speed gears in constant mesh interposed operatively between said shafts, separate shafts on which the driving gears are mounted, armatures on each of said last named shafts, magnetic field pieces carried with the driving shaft and coöperating with said armatures to couple them magnetically with the driving shaft and means to operate the magnetic devices selectively.

4. A transmission for automobiles comprising a driving shaft, a driven shaft, speed gears in constant mesh interposed operatively between said shafts, separate shafts on which the driving gears are mounted, armatures on each of said last named shafts, a circular cage carried with the driving shaft, pole pieces mounted in the peripheral wall of the cage to coöperate respectively with the armatures, fields for said pole pieces and means to energize the fields selectively for coupling the various fields magnetically with the respective armatures.

5. A transmission for automobiles comprising a driving shaft, a driven shaft, speed gears of different ratios in constant mesh interposed operatively between said shafts, tubular shafts of different lengths mounted one within another on which the driving gears are carried, armatures on each of said last named shafts, a circular casing carried with the driving shaft and provided with magnetic field pieces coöperating with said armatures to couple them magnetically with the driving shaft, and means to control the magnetic devices selectively.

6. A transmission for automobiles comprising a driving shaft, a driven shaft, speed gears in constant mesh interposed operatively between said shafts, separate shafts on which the driving gears are mounted, armatures on each of said last named shafts, a circular casing carried with the driving shaft, magnetic field pieces mounted in the peripheral wall of the casing, contact rings for the fields of the respective armatures carried on the casing, brushes coöperating with the contact rings and means to control the circuits of the fields selectively.

7. A transmission for automobiles comprising a flatwheel mounted thereon, a driven shaft, speed gears in constant mesh interposed operatively between said shafts, separate shafts on which the driving gears are mounted, armatures on each of said last named shafts, a circular casing mounted on the face of the flat wheel and inclosing said armatures, bearings in the end wall of said casing for said last named shafts, magnetic field pieces mounted in the peripheral wall of the casing for coöperation with the respective armatures and means to control the magnetic devices selectively to couple them magnetically with the driving shaft.

8. A transmission for automobiles comprising a driving shaft, a driven shaft, speed gears of different ratios in constant mesh interposed operatively between said shafts, a gear casing inclosing said gears, telescoped separate shafts on which the driving gears are mounted journaled in the end wall of the gear casing, armatures on each of said last named shafts, a circular casing for the armature carried with the driving shaft, said tubular shafts extending through the end wall of the circular casing and being journaled therein magnetically, field pieces mounted in the peripheral wall of the circular casing and coöperating with the armatures, field windings for the field pieces carried on the outer peripheral wall of the circular casing, contact rings for the respective field windings on the end wall of the circular casing, brushes coöperating with the rings and means to control the several circuits selectively.

This specification signed this 25th day of June A. D. 1917.

ALFRED W. GROTE.